US007677969B2

(12) United States Patent
Rist

(10) Patent No.: US 7,677,969 B2
(45) Date of Patent: Mar. 16, 2010

(54) BILL ACCEPTOR FOR A GAMING MACHINE

(75) Inventor: James Rist, Lane Cove (AU)

(73) Assignee: Aristocrat Technologies Australia Pty. Limited (AU)

( * ) Notice: Subject to any disclaimer, the term of this patent is extended or adjusted under 35 U.S.C. 154(b) by 970 days.

(21) Appl. No.: 10/020,484

(22) Filed: Dec. 12, 2001

(65) Prior Publication Data

US 2003/0109302 A1 Jun. 12, 2003

(51) Int. Cl.

| | |
|---|---|
| ***A63F 13/02*** | (2006.01) |
| ***A63F 13/08*** | (2006.01) |
| ***A63F 9/24*** | (2006.01) |
| ***G07C 3/00*** | (2006.01) |
| ***G07F 9/02*** | (2006.01) |
| ***G07F 9/08*** | (2006.01) |
| ***G07F 7/04*** | (2006.01) |
| ***G07D 7/02*** | (2006.01) |
| *G07F 17/34* | (2006.01) |
| *A63F 5/04* | (2006.01) |

(52) U.S. Cl. .......................... 463/25; 463/47; 194/200; 194/205; 194/206; 194/212; 194/302

(58) Field of Classification Search .................. 463/25, 463/26, 27, 28, 29, 16, 17, 18, 19, 20, 40, 463/41, 42, 47; 194/304, 317, 318, 319, 194/306, 307, 302, 200, 205, 206, 207, 208, 194/209, 210, 211, 212, 213, 215; 235/382, 235/382.5, 379, 380, 375

See application file for complete search history.

(56) References Cited

U.S. PATENT DOCUMENTS

| | | | | |
|---|---|---|---|---|
| 4,291,294 | A * | 9/1981 | Chase | 340/951 |
| 4,546,869 | A * | 10/1985 | Dean et al. | 194/303 |
| 5,564,548 | A * | 10/1996 | Dobbins et al. | 194/317 |
| 5,611,730 | A * | 3/1997 | Weiss | 463/20 |
| 5,700,195 | A * | 12/1997 | Halic | 463/29 |
| 5,730,272 | A * | 3/1998 | Dobbins et al. | 194/317 |
| 5,836,818 | A * | 11/1998 | Jones et al. | 463/29 |
| 5,931,277 | A * | 8/1999 | Allan et al. | 194/317 |
| 5,970,165 | A * | 10/1999 | Itako | 382/135 |
| 6,162,122 | A * | 12/2000 | Acres et al. | 463/29 |
| 6,247,572 | B1 * | 6/2001 | Neborsky et al. | 194/200 |
| 6,506,116 | B1 | 1/2003 | Sunaga et al. | |
| 6,564,997 | B1 * | 5/2003 | Juds | 235/382 |
| 6,641,034 | B1 * | 11/2003 | Oki et al. | 235/380 |
| 6,712,191 | B2 * | 3/2004 | Hand | 194/344 |

(Continued)

OTHER PUBLICATIONS

U.S. Appl. No. 60/337,409, published as patent 7,014,029 B2 and pre-grant publication 2003/0111316 A1.*

*Primary Examiner*—Peter DungBa Vo
*Assistant Examiner*—Matthew D. Hoel
(74) *Attorney, Agent, or Firm*—McAndrews, Held & Malloy, Ltd.

(57) ABSTRACT

A bill acceptor for a gaming machine including a receiving zone for receiving a tendered bill. A sensing device is arranged at an input region of the receiving zone for sensing at least one characteristic of the bill. A controller is in communication with the sensing device for receiving an output signal from the sensing device. An annunciator is controlled by the controller to be activated when a bill acceptance rate of the controller drops below a predetermined threshold.

10 Claims, 3 Drawing Sheets

U.S. PATENT DOCUMENTS 6,722,487 B1 * 4/2004 Bell ........................... 194/302
6,742,644 B1 * 6/2004 Heidel ........................ 194/206
6,899,215 B2 * 5/2005 Baudat et al. ............... 194/328
6,923,306 B2 * 8/2005 Hand ......................... 194/350
7,014,029 B2 * 3/2006 Winters ...................... 194/302
7,390,257 B2 * 6/2008 Paulsen et al. ................ 463/16
2001/0013456 A1 * 8/2001 Ishida et al. ................ 194/217
2002/0125627 A1 * 9/2002 Hand ...................... 271/10.01
2003/0111316 A1 * 6/2003 Winters ...................... 194/302

* cited by examiner

BILL ACCEPTOR FOR A GAMING MACHINE

FIELD OF THE INVENTION

This invention relates to a gaming machine. More particularly, the invention relates to a bill acceptor for a gaming machine and to a method of operating a bill acceptor of a gaming machine.

BACKGROUND TO THE INVENTION

It is becoming more and more prevalent for gaming machines to accept "paper" money or bank notes from players wishing to play gaming machines. As a result, more and more gaming machines include bill acceptors for such bank notes.

It is important that a bill acceptor be extremely accurately set to ensure that the insertion of false or counterfeit bank notes is kept to a minimum thereby minimising losses which the gaming machine operator may suffer.

Because the bill acceptor is a sensitive item, it may have a tendency to have a high rejection rate. As a result, a gaming machine equipped with such a bill acceptor may not be frequented by players wishing to use bank notes due to the rejection of the bank notes by the bill acceptor.

It is also desirable that, should one wish to alert a technician to the fact that a bill acceptor may be malfunctioning, it be done in a discrete manner so as not to disturb a player playing that gaming machine who may have been using another form of credit such as coins, tokens, cards, or the like.

SUMMARY OF THE INVENTION

According to a first aspect of the invention, there is provided a bill acceptor for a gaming machine, the bill acceptor comprising:

a receiving zone for receiving a bill;

a sensing device at an input region of the receiving zone for sensing at least one characteristic of the bill;

a controller in communication with the sensing device for receiving an output signal from the sensing device; and an annunciator controlled by the controller to be activated when a bill acceptance rate of the controller drops below a predetermined threshold.

The term "bill" is to be understood in this specification, unless the context clearly indicates otherwise, as a form of paper currency such as a bank note. Further, the term "bill acceptance rate" as it is used in this specification is to be understood, unless the context clearly indicates otherwise, as the number of bills which are accepted in a batch of bills tendered to the gaming machine. It does not refer to the speed with which the controller accepts or rejects a tendered bill.

The receiving zone may incorporate a platen on which the bill is received and a slot at an end of the platen into which the bill is to be inserted. The platen may be arranged in a midtrim of the machine.

The sensing device may be arranged within the machine, inwardly of the slot. The sensing device may sense at least one of optical, magnetic and dimensional characteristics of the bill. In use, more than one of these characteristics may be sensed by the sensing device to reduce the prevalence of fraudulent or counterfeit bills.

The receiving zone may include an attracting means for indicating to a patron where the bill is to be inserted into the slot. The attracting means may comprise an array of illuminating elements arranged in the platen of the receiving zone.

In addition, the annunciator may also be arranged in the receiving zone.

The controller may cause the array of illuminating elements to be illuminated in a predetermined, first pattern and the annunciator may be implemented in the form of an illumination of the illuminating elements in a second, different pattern. The illuminating elements may be, for example, light emitting diodes (LED's). The LED's may be arranged in two rows. The rows may converge towards the slot. The first pattern may comprise sequential energising of corresponding LED's in each row followed by sequential de-energising of the corresponding LED's in each row. This may then constitute the first pattern. Upon completion of the first pattern, all the LED's may be energised so that they are all simultaneously illuminated and this may constitute the second pattern being the implementation of the annunciator.

Accordingly, the second pattern may be activated after completion of the first pattern when the bill acceptance rate has dropped below said predetermined threshold. This predetermined threshold may be set as desired by an operator of the gaming machine. For example, the threshold may be a bill acceptance rate of about 70% to 90% of tendered bills, preferably about 75% to 85% of tendered bills and, optimally, about 80% of tendered bills.

The gaming machine may be connected to a network. When the controller of such a gaming machine is connected to the network, a network monitoring system may monitor the acceptance rate of bills by the controller and may activate an alarm means when the acceptance rate drops below the predetermined threshold. This gives venue operating and service personnel an on-line and immediate indicator of the performance of the bill acceptor of the gaming machine. The monitoring system may activate a visual or audible alarm indicating the need for attention to the bill acceptor.

According to a second aspect of the invention, there is provided a method of operating a bill acceptor of a gaming machine, the method including the steps of:

sensing at least one characteristic of a bill inserted into the bill acceptor;

monitoring a bill acceptance rate by a controller; and activating an annunciator when the bill acceptance rate drops below a predetermined threshold.

The method may include energising illuminating elements of the bill acceptor in a predetermined pattern and, when the bill acceptance rate drops below said threshold, energising the illuminating elements in a second, different pattern, said second pattern of illumination of the illuminating elements serving as the annunciator. The second pattern of illumination of the illuminating elements may follow completion of the first pattern.

As indicated above, when the gaming machine is connected to a network, the method may include transmitting a signal on the network to which the gaming machine is connected to a network monitoring system to activate an alarm means when the bill acceptance rate drops below said predetermined threshold.

BRIEF DESCRIPTION OF THE DRAWINGS

The invention is now described by way of example with reference to the accompanying drawings in which.

DETAILED DESCRIPTION OF THE DRAWINGS

Figure 1:
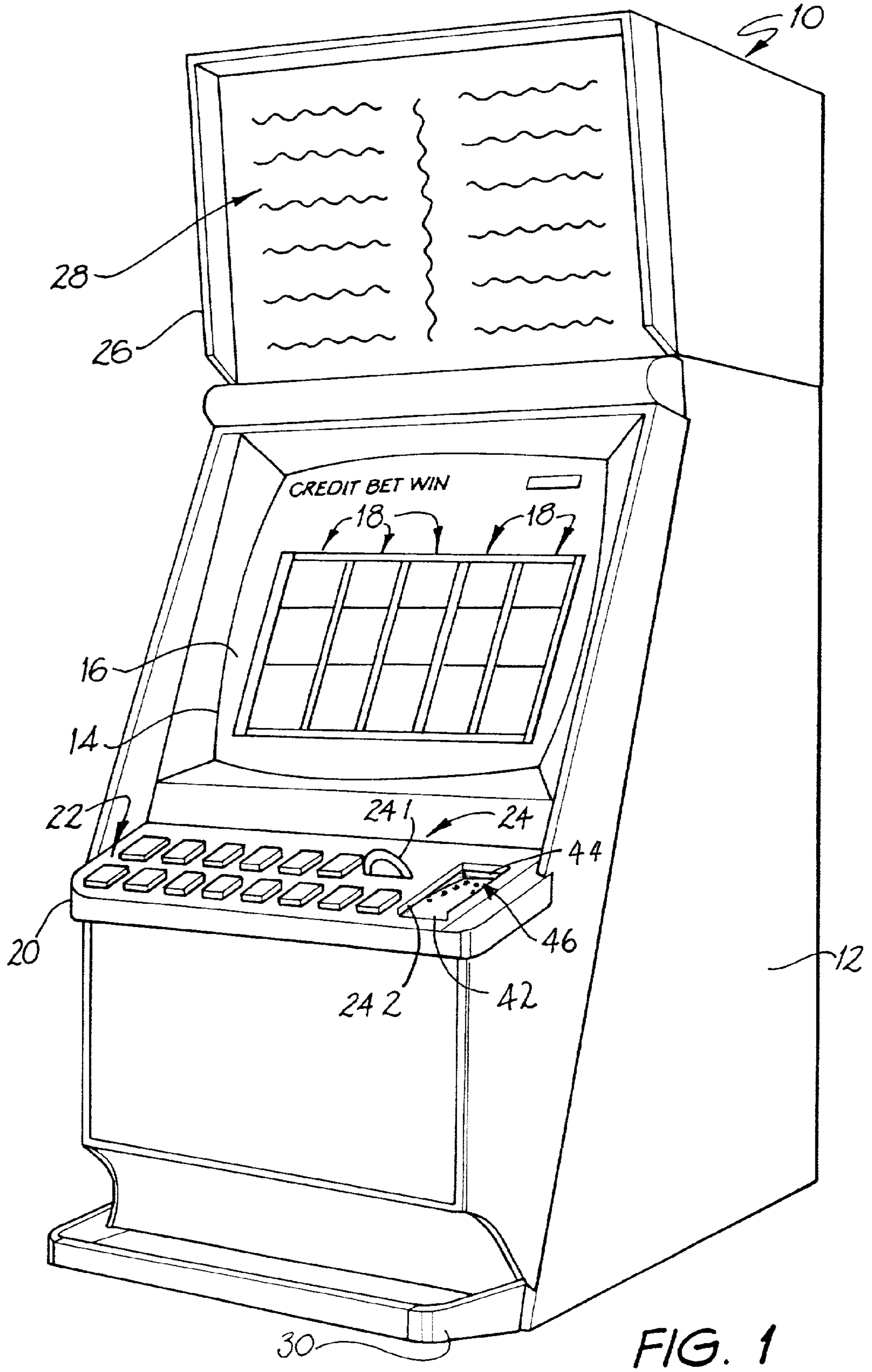
FIG. 1 shows a perspective view of a gaming machine.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2. The mechanism 24 may, in addition to the coin input chute 24.1 and the bill collector 24.2, include a credit card reader (not shown) or any other type of validation device.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
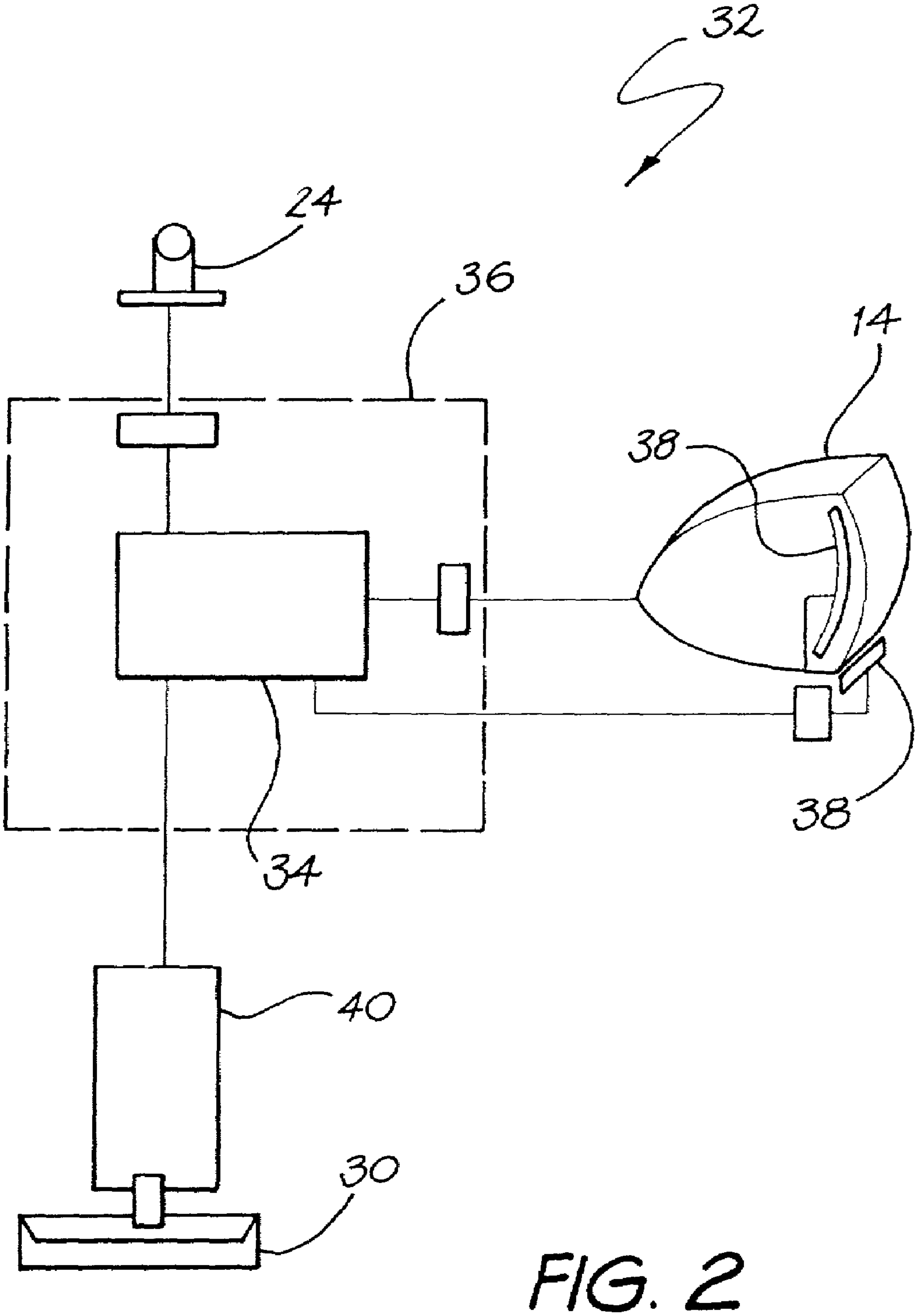
FIG. 2 shows a block diagram of a control circuit of the gaming machine.

Referring to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing.

Finally, the controller 36 drives a payout mechanism 40 which, for example, may be a coin hopper for feeding coins to the coin tray 30 to make a pay out to a player when the player wishes to redeem his or her credit.

The bill acceptor 24.2 includes a platen 42 leading to an input slot 44. An illuminating means in the form of an array of light emitting diodes (LED's) 46 is arranged in the platen 42 of the bill acceptor 24.2.

Figure 3:
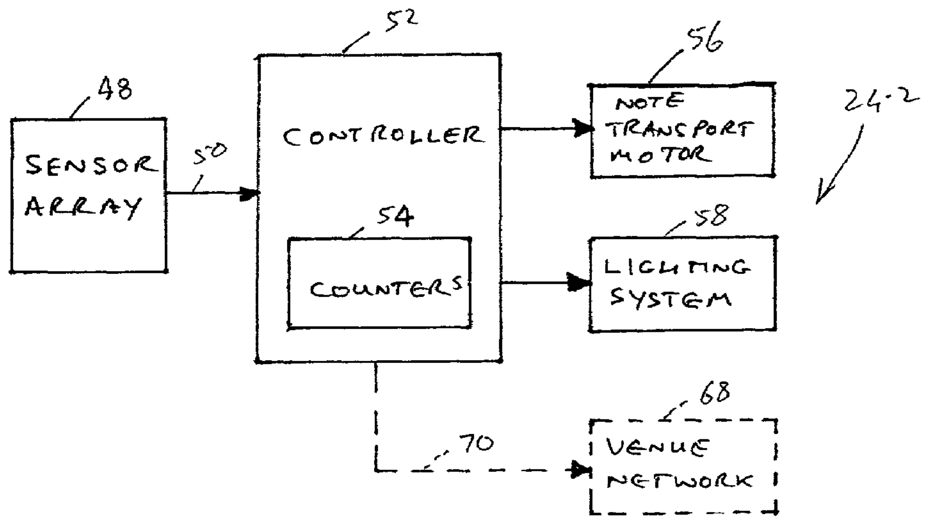
FIG. 3 shows a block diagram of a controller of a bill acceptor of the gaming machine.

The bill acceptor 24.2 further includes a sensing device in the form of a sensor array 48 (FIG. 3). The sensor array 48 senses optical, magnetic and dimensional characteristics or properties of a bill tendered to the bill acceptor 24.2 of the gaming machine 10. The sensor array 48 outputs signals on line 50 to a controller 52. The controller 52 is a bill acceptor controller and communicates with the controller 34 of the gaming machine 10.

The controller 52 includes a group of counters 54. A first counter of the group of counters 54 is incremented each time a bill is accepted by the bill acceptor 24.2.

Accordingly, when a bill is tendered to the bill acceptor 24.2 by being placed on the platen 42 it is received in the slot 44 and is drawn into the sensor array 48 by a transport motor 56 under the action of the controller 52. The bill is then sensed by the sensor array 48 which determines whether or not its optical, magnetic and dimensional properties meet the required criteria. If the bill is accepted, the transport motor 56 is again energised which feeds the bill to a receptacle (not shown) contained within the console 12 of the gaming machine 10. The first counter of the group of counters 54 is incremented by one.

Conversely, if the sensor array 48 determines that the bill is unacceptable, the transport motor 56 is operated in the reverse direction and the note is ejected from the slot 44 of the bill acceptor 24.2. A second counter of the group of counters 54 is incremented by one.

After each tender of a bill, the controller 52 updates its calculation of the bill acceptance rate (BAR) according to the formula:

$$\text{BAR}(\%)=[A/(A+R)]\times 100\%,$$

where A=value of first counter of the group of counters 54; and

R=value of second counter of the group of counters 54.

When the acceptance rate as determined by the controller 52 is at or above the predetermined threshold, for example, a BAR of 80%, the array of LED's 46 of the bill acceptor 24.2 is energised in a predetermined, first pattern under the action of the controller controlling a lighting system 58.

Figure 4:
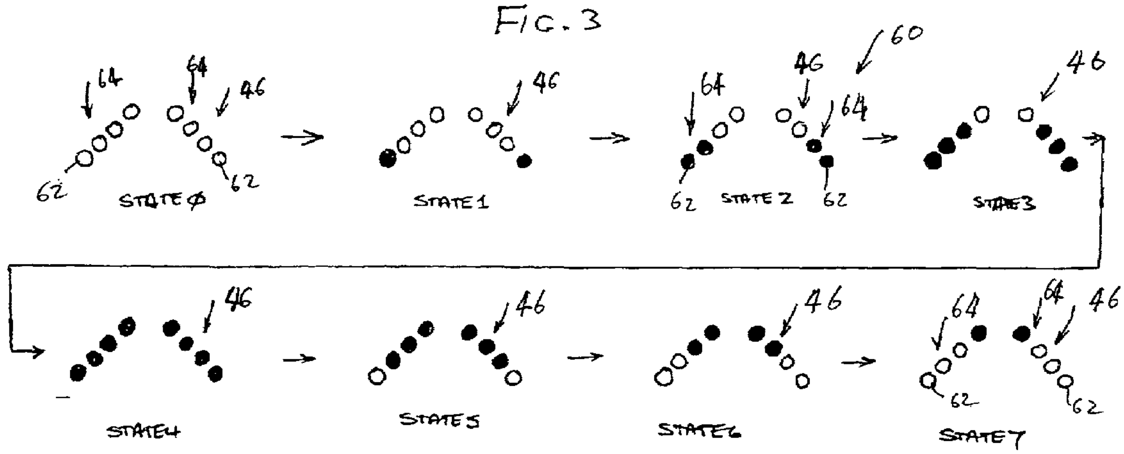
FIG. 4 shows a sequence of illumination of illuminating elements of the bill acceptor of the gaming machine.

A typical pattern is as shown in FIG. 4 of the drawings and is designated generally by the reference numeral 60. The array 46 comprises eight LED's 62 arranged in two converging rows 64. The rows 64 converge towards the slot 44 of the bill acceptor 24.2.

Under the control of the lighting system 58, in State 0, all of the LED's 62 remain de-energised. Thereafter, in a first state, the first LED 62 in each row is energised. By "first" is meant those LED's furthest from the slot 44. In the second state, the first LED's 62 remain energised and the second LED's 62 are also energised. Similarly, in the third and fourth states the third LED 62 in each row 64 and fourth LED 62 in each row 64 are energised, respectively. In State 5, the first LED's 62 are de-energised while the remaining LED's 62 in each row remain energised. In the sixth state, the second LED 62 in each row 64 is de-energised and in the seventh state the third LED 62 in each row is de-energised.

It will be appreciated that this happens reasonably quickly to create the impression of the LED's 62 being illuminated towards the slot 44 to create the impression of something being fed towards the slot 44 to act as an attracting means to a patron wishing to insert a bill into the bill acceptor 24.2.

When the BAR is above the predetermined threshold, the pattern 64 continues indefinitely.

Figure 5:
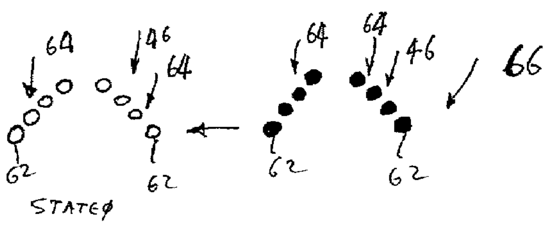
FIG. 5 shows operation of an annunciator of the bill acceptor of the gaming machine.

However, when the BAR drops below the predetermined threshold, upon completion of the pattern 60, a new pattern (as shown by reference numeral 66 in FIG. 5 of the drawings) is interposed between States 7 and 0. In other words, once the last LED 62 in each row 64 of the array 46 has been energised as in the case of State 7, all the LED's 62 in each row 64 are energised before they are all de-energised as is shown for State 0. This new pattern 66 continues to be inter posed between State 7 and State 0 for as long as the BAR remains below the predetermined threshold.

With this arrangement, a technician can, by monitoring the pattern 60, determine whether or not the BAR of the controller 52 is above the required threshold and, if not, is alerted by the annunciator as implemented by the pattern 66 to take the appropriate remedial action.

It is an advantage of the invention that the pattern 66, which functions as the annunciator for the technician, is discrete and that a player playing the gaming machine 10 using other means of credit input, such as coins or a card, is not disturbed by the change in pattern on the bill acceptor 24.2.

The gaming machine 10 may be connected to a network in the venue. In that case, the controller 52 feeds information regarding the BAR to a venue network system 68 (FIG. 3) via a network communications line 70. The system 68 then gives venue operating and service personnel an on-line and immediate indicator of the performance of the bill acceptor 24.2 of each gaming machine 10 enabling remedial action to be taken in an expedited manner when the BAR of any gaming machine in the network drops below the predetermined threshold. The system 68 could, for example, activate a visual or audible alarm (not shown) indicating the need for attention to a bill acceptor 24.2 of any gaming machine on the network.

It is an advantage of the invention that a discrete arrangement is provided for determining the bill acceptance rate of a bill acceptor 24.2 of a gaming machine 10, whether networked or not. It will be appreciated that if the controller 52 has a too high rejection rate of bills, the revenue received by the venue in which the gaming machine 10 is installed could be adversely affected as players may not have coins to play the machine instead. Accordingly, it is important that, when a bill acceptor 24.2 of a gaming machine 10 has an unacceptable high rejection rate, remedial action can be taken urgently.

In addition, the manner in which a technician is alerted to a malfunctioning bill acceptor 24.2 takes place in a discrete manner using the invention so that patrons are not disturbed in their playing of the gaming machine.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming machine comprising:

a bill acceptor configured to receive bills tendered, the bill acceptor comprising a sensor configured to evaluate each received bill and to output a signal indicative of one of an acceptance and a rejection of the received bill;

an annunciator having an array of illuminating elements configured to be illuminated in first, second, and third illuminating patterns, the first illuminating pattern being different from the second illuminating pattern, the second illuminating pattern being different from the third illuminating pattern, and the first illuminating pattern being different from the third illuminating pattern; and a controller having a first counter and a second counter, the controller configured to increment the first counter on each occurrence of an acceptance signal, increment the second counter on each occurrence of a rejection signal, determine a bill acceptance rate based upon a ratio of a count of the first counter to a sum comprising respective counts of the first and second counters, detect a malfunction of the bill acceptor based upon the bill acceptance rate, sequentially energize the array of illuminating elements in the first, second, and third patterns repetitively to indicate that a malfunction of the bill acceptor has not been detected, and sequentially energize the array of illuminating elements in the first, second, third, and second patterns repetitively to indicate a malfunction of the bill acceptor has been detected.

2. The gaming machine of claim 1, wherein the annunciator is arranged in an area of the bill acceptor that receives bills and is visible external of the gaming machine.

3. The gaming machine of claim 1, wherein the controller is configured to detect a malfunction of the bill acceptor in response to the bill acceptance rate falling below a value, and the value is at most about 90 percent.

4. The gaming machine of claim 1, wherein the controller is configured to detect a malfunction of the bill detector in response to the bill acceptance rate falling below a value, and the value is at most about 80 percent.

5. The gaming machine of claim 1, wherein the controller is configured to detect a malfunction of the bill detector in response to the bill acceptance rate falling below a value, and the value is at most about 70 percent.

6. The gaming machine of claim 1, wherein the controller is further configured to determine an updated bill acceptance rate following each insertion of a bill into the bill acceptor.

7. The gaming machine of claim 6, wherein the gaming machine further comprises a network interface and wherein the controller is in communication with the network interface and communicates signals relating to the bill acceptance rate to the network interface for communication onto a network.

8. The gaming machine of claim 1, wherein the first, second, and third illuminating patterns are configured to create an impression feeding towards the bill acceptor.

9. A method of operating a bill acceptor of a gaming machine, the gaming machine including an annunciator represented by an array of illuminating elements, the method comprising:

receiving a bill at the bill acceptor;

sensing at least one characteristic of the received bill;

generating one of an acceptance signal and a rejection signal using the at least one sensed characteristic;

incrementing a respective one of an acceptance counter and a rejection counter based on the respective acceptance and rejection signals;

determining a bill acceptance rate of the bill acceptor based on dividing a cumulated value of the acceptance counter by a sum comprising respective cumulated values of the acceptance and rejection counters;

detecting a malfunction of the bill acceptor in response to the bill acceptance rate falling below a value automatically, repetitively, and sequentially activating a plurality of illuminating elements in first, second, and third patterns, the first illuminating pattern being different from the second illuminating pattern, the second illuminating pattern being different from the third illuminating pattern, and the first illuminating pattern being different from the third illuminating pattern in response to not detecting a malfunction of the bill acceptor; and automatically, repetitively, and sequentially activating the plurality of illuminating elements in first, second, third, and second patterns in response to detecting a malfunction of the bill acceptor.

10. The method of claim 9, wherein the first, second, and third illuminating patterns are configured to create an impression feeding towards the bill acceptor.

* * * * *